Patented Dec. 7, 1948

2,455,392

UNITED STATES PATENT OFFICE 2,455,392

ADHESIVES

Eric John Gray Bailey, Welwyn Garden City, Francis M. Page, Newcastle under Lyme, and John C. McGowan, Muswell Hill, London, England, assignors to Imperial Chemical Industries Limited, a corporation of Great Britain No Drawing. Application February 6, 1947, Serial No. 726,970. In Great Britain February 15, 1946

10 Claims. (Cl. 260—30.4)

This invention relates to improvements in or relating to gap-filling adhesives particularly gap-filling adhesives based on amido-formaldehyde condensation products, such as urea, thiourea and/or melamine formaldehyde condensation products.

It is well known that amido-formaldehyde condensation products may be used as adhesives in the presence of water, e. g. 5 to 50% of their weight of water, and hardeners of an acid or acid producing reaction, such hardeners and/or water being added to the adhesive immediately prior to its use. These adhesives suffer, however, from one serious disadvantage in that relatively thick layers of the adhesive after they have hardened exhibit a tendency to craze and disintegrate with consequent weakening. Thus, when surfaces to be bonded together fit intimately, no trouble is experienced, but, when the surfaces are rough or uneven or when it is not possible or desirable to apply adequate pressure to force surfaces to be bonded together to fit intimately, amido-formaldehyde condensation products hardened with hardeners of an acid or acid-producing reaction form a layer or localised layers of appreciable thickness between the surfaces and in the course of time crazing and disintegration occurs with consequent deterioration of the strength of the bond between the surfaces.

It is known that fillers such as rye flour, starch or wood flour tend to inhibit the above mentioned crazing and these fillers are therefore used in amido-formaldehyde gap-filling adhesives. Fillers also extend the adhesives and reduce the cost of material necessary to fill joints. Furthermore amido-formaldehyde condensation products spread more easily when mixed with one or more fillers than when not filled. Finely ground minerals, such as china clay, have also been incorporated in the known gap-filling adhesives to reduce their cost and improve the ease with which they are spread. Between 5 and 25% by weight filler based on the weight of condensation product is normally used in amido-formaldehyde gap-filling adhesives as smaller quantities of filler are of little effect and adhesives containing larger quantities of filler can only be spread on surfaces with great difficulty. It is also normal practice to prepare a mixture of the filler or fillers and the hardener or hardeners of an acid or acid producing reaction and stir this mixture into the amido-formaldehyde condensation product and water immediately before the adhesive is used, the water being normally all or part of the water of a formaldehyde solution used in the preparation of the amido-formaldehyde condensation product. Alternatively a dry amido-formaldehyde condensation product may be mixed with filler and a non-volatile solid hardener, and water may be added to the mixture obtained immediately before the adhesive is used.

It has previously been proposed to inhibit or prevent crazing in amido-formaldehyde gap-filling adhesives by using a modified or treated resin or a treated filler.

According to the present invention we have now found that amido-formaldehyde gap-filling adhesives which contain between 2 and 50% by weight of the amido-formaldehyde condensation product of di(tetrahydrofurylethyl) carbinol craze particularly slowly or not at all, di(tetrahydrofurylethyl) carbinol having the useful properties of nonvolatility and lack of odour. In the preparation of these adhesives immediately prior to their use this di(tetrahydrofurylethyl) carbinol may be added admixed, if desired, with any of the other ingredients of the adhesives.

The preparation of di(tetrahydrofurylethyl) carbinol is described in Example 3 of British specification No. 476,189.

Mixtures of woodflour and finely ground minerals, such as china clay, are particularly suitable as fillers for the adhesives of this invention because of the low cost of these fillers and because these mixtures when used as fillers result in compositions which are smooth pastes which are easily spread and which form strong bonds when hardened.

An amido-formaldehyde condensation product suitable for use in this invention may be prepared as an aqueous syrup by refluxing at a neutral pH a commercial solution of formaldehyde in water, e. g. containing about 36.6% w/w formaldehyde, in which is dissolved one molecule of urea for every two molecules of formaldehyde. The water content of such syrups may be reduced by distillation under reduced pressure. A syrup containing up to about 72% by weight of condensation product may be obtained by this method, the percentage of condensation product being measured by stoving the syrup 3 hours at 120° C., and weighing the solid residue. Alternatively the urea used in the production of such a syrup may be partially or completely replaced by other compounds having a plurality of —NH₂ groups which form part of amide, thioamide and/or amidine groups for example, by thiourea or melamine. When the urea is replaced completely by melamine it is desirable to use a higher formaldehyde to melamine molecular ratio than 2:1, for example a molecular ratio of 3:1, and in normal practice it is found more advantageous to dehydrate the resulting syrup to a solid resin which can then be ground to a fine powder.

Substantially water free amido-formaldehyde condensation products suitable for use in this invention may be prepared, if desired, by spray drying solutions of the condensation products. A suitable amount of water to add to such a spray-dried condensation product when preparing an adhesive of this invention is 10-50% by weight of the condensation product.

The preferred amount of di(tetrahydrofurylethyl) carbinol for use in the adhesives of this invention is 5 to 25% by weight of the amido-formaldehyde condensation product.

It is also preferred that the adhesives of this invention do not harden unduly rapidly as very rapid hardening increases the incidence and rate of crazing. We find for this reason that when ammonium chloride is used as the hardener for urea formaldehyde adhesives of this invention which are intended to set at room temperature, the most suitable amount of ammonium chloride is between 0.1 and 2.0% by weight of the urea formaldehyde condensation product.

Although the adhesives of this invention are primarily intended for cementing together joints to which it is either not possible or not desirable to apply appreciable pressure or heating, the rate of hardening of the adhesives may be accelerated, if desired, by heat applied for example, by strip heaters, hot presses, high frequency currents or ovens.

The following examples, in which all parts are by weight, will further illustrate how this invention may be carried out in practice, but it is to be understood that this invention is in no way restricted by these examples.

EXAMPLE I

| | Parts |
|---|---|
| Aqueous urea formaldehyde syrup containing about 50% solids | 80 |
| Water | 12 |
| China clay | 20 |
| Woodflour | 10 |
| Ammonium chloride | 0.7 |
| Di(tetrahydrofurylethyl) carbinol | 10 | were mixed together. A smooth paste which was easily applied to joints but did not tend to flow from joints after application was obtained. This paste was used to fill a joint between two wooden surfaces, said joint having gaps in it as great as 0.050" wide. The paste set hard in 12 hours forming a strong bond between the wooden surfaces. The joints so formed showed no sign of crazing or disintegration after one month, whereas a joint bonded with a similar composition which contained no di(tetrahydrofurylethyl) carbinol crazed in about a week.

EXAMPLE II

*Preparation of melamine-urea-formaldehyde syrup*

A mixture of urea and melamine in the molecular ratio of 1.0:0.05 was refluxed with an aqueous solution of formaldehyde, the molecular ratio of formaldehyde to urea plus melamine being 2.2:1.0, at a neutral pH for 3 hours. The resultant syrup was dehydrated until it contained 72% by weight of condensation product, the percentage of condensation product being measured by stoving a sample of the syrup for 3 hours at 120° C. and weighting the solid residue.

| | Parts |
|---|---|
| Melamine-urea-formaldehyde syrup prepared as described above | 80 |
| Water | 12 |
| China clay | 20 |
| Woodflour | 10 |
| Ammonium chloride | 1.0 |
| Di(tetrahydrofurylethyl) carbinol | 10 | were mixed together. A smooth paste which was easily applied to joints but did not tend to flow from joints after application was obtained. This paste was used to fill a joint between two wooden surfaces, said joint having gaps in it as great as 0.050" wide. This paste set hard in 12 hours forming a strong bond between the wooden surfaces. The joints so formed showed no sign of crazing or disintegration after one month, whereas a joint bonded with a similar composition which contained no di(tetrahydrofurylethyl) carbinol crazed in about a week.

We claim:

1. In the process of preparing gap-filling adhesives containing a synthetic amido-formaldehyde resin which are subject to crazing on drying the step of adding thereto from 2% to 50% by weight based on the amido-formaldehyde condensation product of di(tetrahydrofurylethyl) carbinol.

2. The process of claim 1 in which the percentage of di(tetrahydrofurylethyl) carbinol is between 5% and 25%.

3. The process of claim 1 in which the adhesive contains a mixture of wood flour and china clay as a filler.

4. The process of claim 1 in which the adhesive contains from 5% to 50% of water by weight based on the total composition.

5. The process of claim 1 in which the adhesive contains from 0.1% to 2.0% by weight based on the amido-formaldehyde condensation product of ammonium chloride as a hardener.

6. A non-crazing gap-filling adhesive which comprises a synthetic amido-formaldehyde resinous condensation product and from 2% to 50% by weight based on the said condensation product of di(tetrahydrofurylethyl) carbinol.

7. The product of claim 6 in which the percentage of di(tetrahydrofurylethyl) carbinol is between 5% and 25%.

8. The product of claim 6 in which the adhesive contains a mixture of wood flour and china clay as a filler.

9. The product of claim 6 in which the adhesive contains from 5% to 50% of water by weight based on the total composition.

10. The product of claim 6 in which the adhesive contains from 0.1% to 2.0% by weight based on the amido-formaldehyde condensation product of ammonium chloride as a hardener.

ERIC JOHN GRAY BALLEY.
FRANCIS M. PAGE.
JOHN C. McGOWAN.

No references cited.